(12) United States Patent
Aarabi

(10) Patent No.: US 9,965,778 B2
(45) Date of Patent: *May 8, 2018

(54) SYSTEM AND METHOD FOR THE INDICATION OF MODIFICATION REGION BOUNDARIES ON FACIAL IMAGES

(71) Applicant: MODIFACE INC., Toronto (CA)

(72) Inventor: Parham Aarabi, Richmond Hill (CA)

(73) Assignee: MODIFACE INC., Toronto (CA)

(*) Notice: Subject to any disclaimer, the term of this patent is extended or adjusted under 35 U.S.C. 154(b) by 69 days.

This patent is subject to a terminal disclaimer.

(21) Appl. No.: 15/056,748

(22) Filed: Feb. 29, 2016

(65) Prior Publication Data

US 2016/0253713 A1 Sep. 1, 2016

Related U.S. Application Data

(63) Continuation-in-part of application No. 14/228,527, filed on Mar. 28, 2014, now Pat. No. 9,275,400, which is a continuation of application No. 12/626,323, filed on Nov. 25, 2009, now Pat. No. 8,725,560.

(60) Provisional application No. 61/209,828, filed on Mar. 12, 2009, provisional application No. 61/206,520, filed on Feb. 2, 2009.

(51) Int. Cl.
G06Q 30/00 (2012.01)
G06Q 30/02 (2012.01)
G06K 9/00 (2006.01)
G06Q 90/00 (2006.01)

(52) U.S. Cl.
CPC ..... G06Q 30/0271 (2013.01); G06K 9/00248 (2013.01); G06Q 30/02 (2013.01); G06Q 30/0251 (2013.01); G06Q 30/0276 (2013.01); G06Q 90/00 (2013.01)

(58) Field of Classification Search
None
See application file for complete search history.

(56) References Cited

U.S. PATENT DOCUMENTS

| 7,634,103 | B2 * | 12/2009 | Rubinstenn | A45D 44/005 345/619 |
| 8,725,560 | B2 * | 5/2014 | Aarabi | G06Q 30/02 705/14.1 |
| 9,275,400 | B2 * | 3/2016 | Aarabi | G06Q 30/02 |
| 2005/0203724 | A1 * | 9/2005 | Orpaz | A45D 44/005 703/6 |

* cited by examiner

Primary Examiner — Michael W Schmucker
(74) Attorney, Agent, or Firm — Grant Tisdall

(57) ABSTRACT

Computerized method and system for creating a personalized advertisement, and for recommending a product being advertised. An uploaded facial photograph is received, the facial photograph including a plurality of facial features. At least one facial feature of the plurality of facial features is detected. Personal information may be extracted by analyzing the at least one detected facial feature. A product being advertised may be recommended, wherein the recommended product applies to a treatment related to the extracted personal information. A tutorial may indicate on the photograph the facial region to be modified by application of the product, such as to achieve a specific look.

19 Claims, 4 Drawing Sheets

SYSTEM AND METHOD FOR THE INDICATION OF MODIFICATION REGION BOUNDARIES ON FACIAL IMAGES

FIELD

The present disclosure relates generally to a system and method, for creating a personalized advertisement based on detection of facial features from an uploaded photograph, including simulated product usage thereon, and optionally in recommending a product or service for trial.

BACKGROUND

With the exponential growth, of pictures on the Internet, methods of automatically analyzing or processing these pictures are becoming more and more necessary. Signs of such systems can be found through the most popular sites on the Internet, including visual search websites that can search based on visual content, face detection filters on search engines such as Google, as well as automatic image matching applications that detect copyright infringement in images and video.

Digitally-based face detection in particular is finding its way into a variety of internet applications including head tracking for video conferencing, automatically locating faces in photos on social network websites, as well as various facial visual effects.

The detection of facial features has been described in prior patent disclosures by the inventor, and as a result will not be described again here. Far more information, please refer to patent application Ser. No. 11/744,668 as well as other patents by the inventor.

BRIEF DESCRIPTION OF THE DRAWINGS

Embodiments will now be described by way of example only, with reference to the following drawings in which.

DETAILED DESCRIPTION

This description pertains to an automatic method of simulating cosmetic treatments/products on user uploaded photos automatically, and optionally recommending purchase, by a user, of a related product.

In overview, the method may incorporate the following steps: A splash page, video, or other visual suggesting to the user of the possibility of uploading his/her photo into the ad. The photo is then downloaded from the user's computer, digital camera or a kiosk, to the system's servers. The system automatically detects the face of the person in the photo, and uses the face location to estimate the facial feature locations. Based on the location of the face and facial features, the system performs a series of image processing sequences to specific, regions of the face (with each region being related to the position of one or more facial features). Facial feature detection based on face location, and facial gradients plus colors, may be applied via simulation to the photo. Automatically, cosmetic, makeup, weight-loss, anti-aging, and/or other effects are applied to the photo based on the locations of the face and facial features.

The resulting photo may then be uploaded and displayed within the advertisement, showing, at the user's mobile device or a computerized advertising kiosk, the effects of a particular product on the users photo, with the photo serving as a simulation of product usage and encouraging the user to buy the product. The user can then save, print, email, or upload their photo to another website/network/phone.

Figure 1:
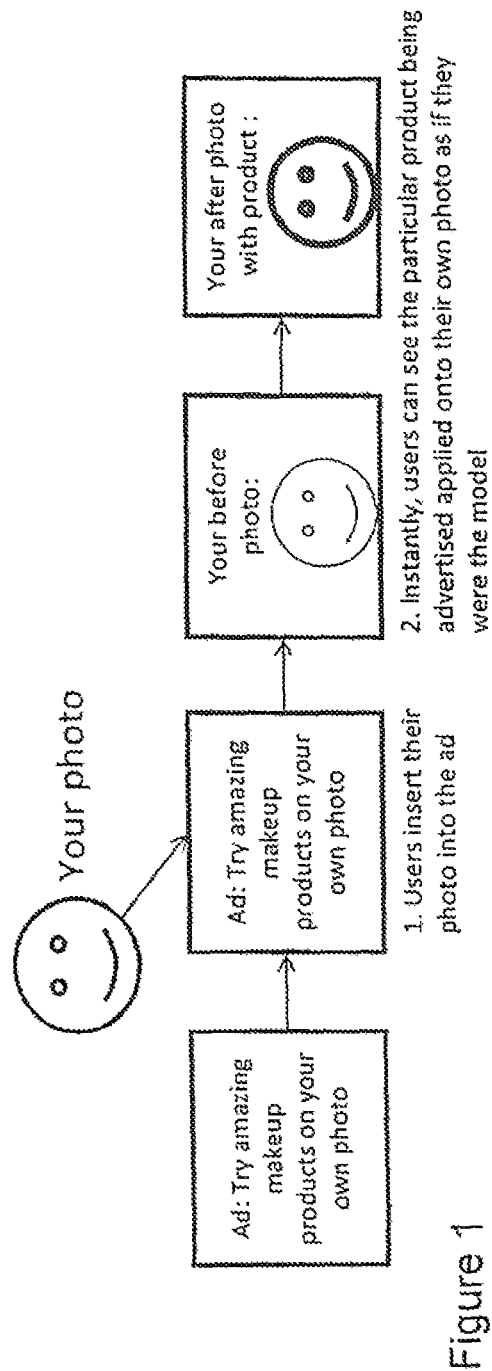
FIG. 1 shows a digital advertising framework where a digital advertisement, running on a website or running on a mobile phone or kiosk, may allow the user to upload their photo.

FIG. 1 shows a digital advertising framework where a digital advertisement (running an a website or running on a mobile phone or kiosk) may allow the user to upload their portrait image or photo into the application in order to instantly see a simulation representative of the particular product being advertised applied to their own face.

Rich media makeover ads may allow a rich interactive makeover application to be embedded in standard ad-sized units of any website. These applications allow the user to upload their photo or portrait image into the ad, thereby creating a personalized advertisement, possibly showing a product, effect, treatment, or scene, on the user's face.

Figure 2:
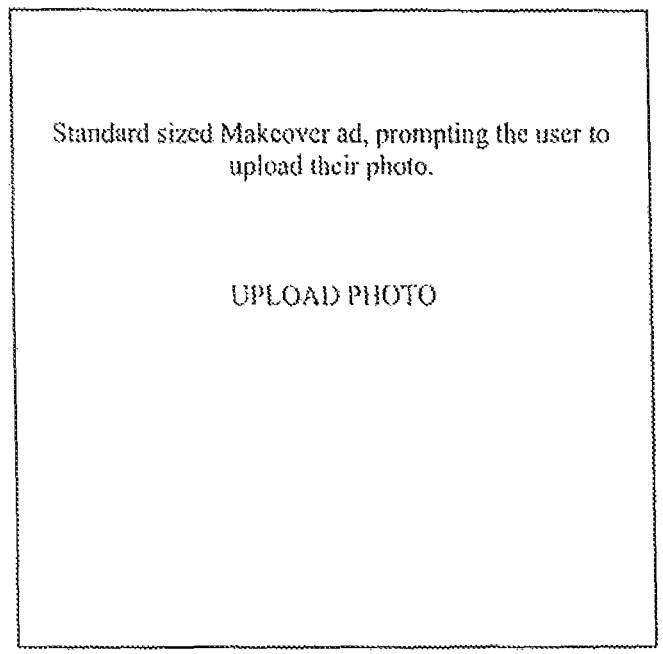
FIG. 2 shows a standard sized makeover ad, prompting the user to upload their photo.

FIG. 2 shows a standard sized makeover ad, which may be located at an advertising website, prompting the user to upload their photo, for example, for simulated trails of advertised products.

Figure 3:
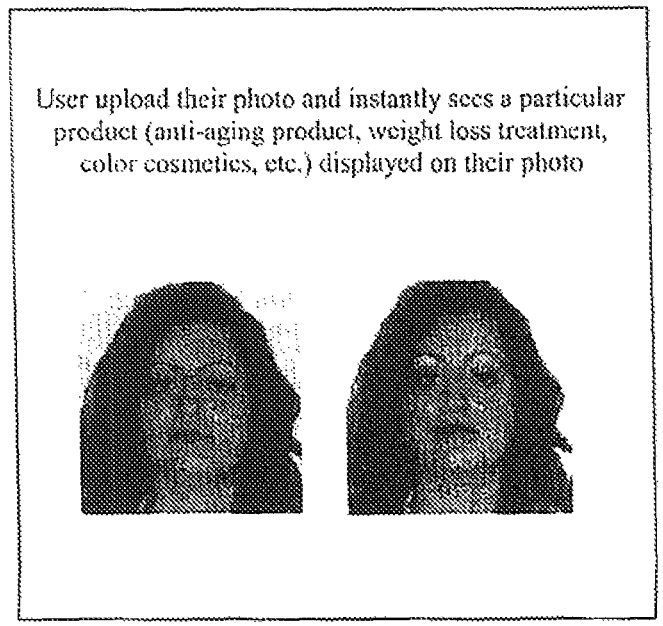
FIG. 3 shows a user photo uploaded into the makeover ad, and instantly seeing the results from simulated usage of a particular product, displayed on their photo.

FIG. 3 shows a user uploaded photo into the makeover ad, with the user instantly seeing the simulated results of applying a particular product, such as an anti-aging product, weight loss treatment product, color cosmetics product, etc., displayed on their photo.

Further examples of detecting some, of the mentioned features from a user uploaded photo are as follows. Detecting any of the parameters of the face outlined above, requires the use of a face and facial feature detector initially. In the following sections, it is assumed that the prior location of the face and the facial features are known.

Detecting Skin Color. Facial skin corresponds to the regions in the face that are not on the features (eyes, lips, nose, etc.). One method of obtaining skin pixels is as follows:

Likelihood of pixel at location $(x,y)$ being skin=likelihood of pixel $(x,y)$ belonging to the face−likelihood of pixel $(x,y)$ belonging to a facial feature.

An estimate of the above formula would be to only include pixels that are on the face, but are not on the facial features. Once we have a subset of such pixels, a three dimensional RGB histogram can be made of the skin pixel colors. Once this histogram is complete, different distribution approximation models can be used to find the densest histogram location (in Red, Green, and Blue space). The average RGB value for this region may be used as the skin color base tone.

Detecting Hair Color. A similar method to the above procedure can be applied to the hair, consisting of selecting hair pixels, which are close to, but not a part of the face. Once these pixels are found, a RGB histogram may be made of the hair pixel colors.

Once this histogram is complete, different distribution approximation models can be used to find the densest histogram location (in Red, Green, and Blue space). The average RGB value for this region is used as the hair color base tone.

Detecting wrinkles and/or acne. A de-wrinkled image may generated by means of smoothing and/or maximum-surrounding-pixel selection. Once the original image is subtracted from the smoothed (or maximum-surround-pixel selected), the difference will be indicative of age and problem areas on the face.

Cosmetic color product simulation. Once the location of the face and the facial features is known, feature enhancement, via the application of various cosmetic coloring product options, can be simulated on the face, described in illustrative manner as follows.

Lip Coloring. In order to visualize different lip shades on the user-uploaded photograph, the location of the lips consisting of a box outlining the lips may be used (the "lip box"). A radial-gradient translucent colored mask, consisting of intense less translucent colors in the center and having increasing translucency in the outward radial directions may be weighted-averaged (with the weight being either preset or chosen by a user) within the boundary of the lip box), resulting in a slight colorization of all of the pixels within the lip box.

While such a colored mask would effectively color the lips as desired, it has two unwanted effects, namely the colorization of the skin around the lips, and the colorization of the teeth if any are shown. To reduce these effects, the following two further steps may be taken, as follows.

During the weighted-averaging of the original image with the colored mask, if the resulting pixel has any component (Red, Green, or Blue) which is lower in intensity than the original image by a certain threshold (lower than X % of the original component intensity, with X ranging from 50-100%), then the value of the original image is used instead.

Secondly, in order to minimize the discolouring effects especially on the teeth, the image contrast of the new colored lip may be increased (with the contrast increase either being preset or chosen by a user).

Once the newly colored lip is obtained, it may be seamlessly blended back into the original image by using a gradient mash to specify the rate of pixels to combine to obtain the resulting image. The gradient mask should result in mostly the new lip for the inner lip pixels and mostly the original lip for the outer lip pixels, where dark regions in the original image correspond to higher weights for the new lip (and lower weights for the old lip), and lighter regions correspond to lower weights for the new lip.

Optionally, different lip colors may be used along with multiple blending masks in order to create a multi-tone color effect on the lips.

Eye Definition. In order to visualize various cosmetics for the eyes or eyebrows (including eyelash extension, eye shadow, and other eye makeup treatments/products), the definition of the eye may be increased through the following steps, where again a boundary box may be used as an indication of a given eye region. The image contrast in each boundary box may be increased so as to simulate the application of cosmetic color products. The resulting high-contrast eye may be blended back (using a gradient blending mask, similar to the one discussed above which is used to blend the recolored lips back into the photograph) in the original image. To simulate specific eye treatments, such as eyebrow coloring, upper eye shadow, lower eye shadow, etc., only specific sections of the high-contrast eye may be blended back into the original image.

Foundation/Blush/Cheeks. Different regions of the face can be colored by using a gradient translucent color mask applied to each part of the face. In other words, different part of the face, such as below the left and right eye boxes) may be colored by a certain amount (0-100%), with the amount defining the percentage of the new color that is blended with the original color.

In any of the above cases, multiple product types, colors and styles may be shown, and offered to a user to try, allowing a user to try combinations of products via visualizations by simulated usage on their photographs. The user may interact and apply products to their photos (by simulated usage) via a website, a standalone kiosk or a mobile device.

Figure 4:
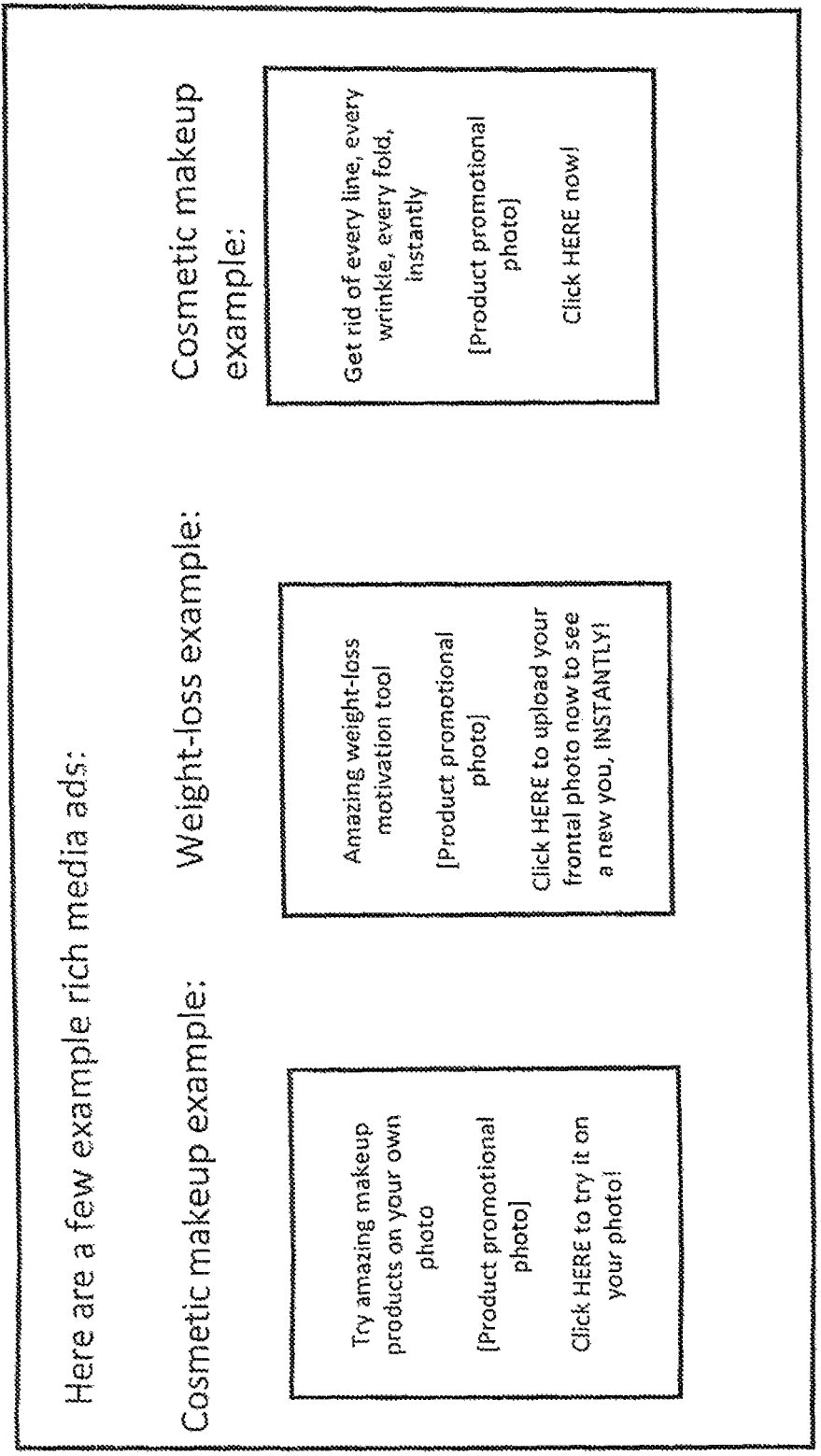
FIG. 4 shows exemplary rich media makeover ads, which when personalized with a user-uploaded photo, target or recommend a particular product to the user.

FIG. 4 shows examples where rich media makeover ads, after the user uploads a photo to personalize the ad, can target or recommend a particular product to the person uploading their photo. By analyzing the photo, it is possible to extract personal information automatically such as age, sex, skin color, hair color, mouth openness, nose shape, lip shape, eye shape, skin features and anomalies, and so forth. For example, such an ad could automatically detect the age of the person and then suggest or recommend treatment using an age-appropriate skin cleansing cream. The feature detection method may utilize skin, color, edge and texture information to locate the skin, the eyes and the lips, in order to automatically place simulated products/effects at the appropriate locations on the image.

Figure 5:
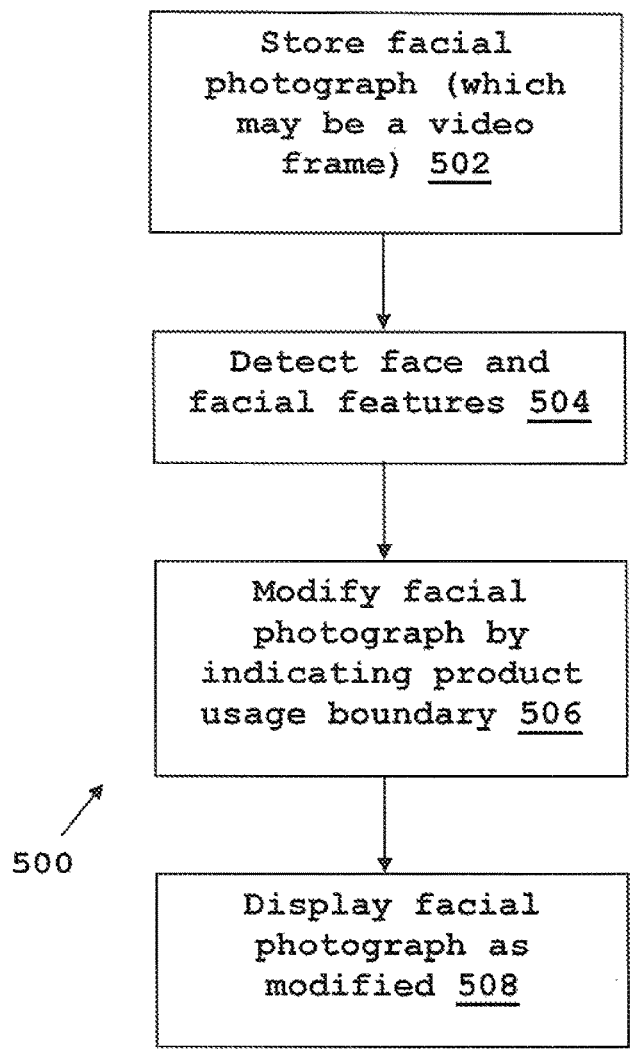
FIG. 5 shows a flow chart of operations of a computer system.

Further digital product tutorials may be provided that illustrate to the user how and where to apply a facial product on their face. This example shares many system operations with the previously described examples. For example, with reference to FIG. 5, the operations 500 may comprise storing a digital advertisement 502, receiving a facial photograph 504 (which may be a facial video frame), detecting facial features 506, modifying the photograph (or video frame) (e.g. through product simulation or by indication a region to be modified by product application), and displaying the photograph as modified to the user 508.

Figure 6:
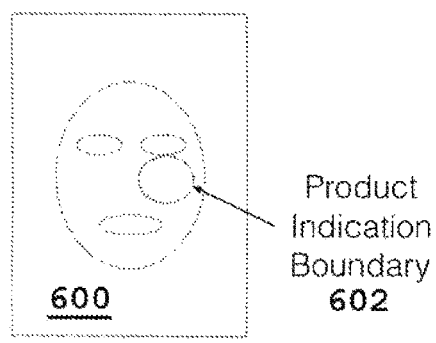
FIG. 6 shows an example of a photograph having a facial region indicated as a part of a tutorial for personalized product application.

With reference to FIG. 6, in accordance with a tutorial example, a facial region for modification 602 (e.g. a location where a product can be applied) is shown on the photograph 600. The facial region for modification 602 may be indicated using various means such as in the form of a product colored region, an outline, an animation, or any other type of indication illustrating where the product should be applied. The system may optionally illustrate additional product usage regions (e.g. additional facial regions for modification) (not shown in FIG. 6) in order to achieve a certain look.

Additionally, the simulation of the particular product being advertised may optionally conclude the product tutorial.

The facial regions for modification may optionally be defined based on the relative location of the facial features or based on the overall facial boundary.

As discussed previously in relation to eye definition, a boundary region may be used as an indication of a facial product usage region. This boundary may be relative to the facial features (i.e. above the eye), or may be relative to the location of the face. A plurality of different boundary regions may be associated with a same facial region (e.g. through a relative location to the facial feature or a boundary of the face), such that different looks can be simulated. For example different shapes for the boundary region may be used to give different looks for eye definition, cheek, bones, lips, etc.

In one example, the system may present one or more product choices (including combination of products as a product choice) to a user. The system may receive a user selection of a product choice to learn about product application in a tutorial. Combinations of products may include combinations of a same type of product such as two or more eyeshadows to apply together or two or more lip products to apply together, among others same product types. Combinations of products may include combinations of different types of products such as a combination of a blush and a powder, a lip stick and an eyeshadow, or an eye shadow, eye liner and eyebrow pencil, among other combinations of different types.

The system may present one or more specific looks to achieve through application of the product choice and receive a user selection of a specific look. The one or more selections may identify which digital advertisement to employ. The facial region or regions for modification may be associated with the digital advertisement. In other examples, the system may be predefined to show specific product choices and looks with less or no selection by a user.

The examples below describe two different application areas (facial regions for modification):

Example 1

The product in this example is an eyeshadow region just above the eye. Here, a boundary region custom created for a particular "smokey eye" look (e.g. appearance) is stored as part of the advertisement and displayed on the facial photograph just above the eye location. Here, the location of the boundary region is relative to the eye, and if the eye location were to change in the facial photograph then the location of the product usage boundary region (facial region to modify) would also move.

In this example, an animated outline for the eyeshadow region may be illustrated on the facial photograph as a clear indication to the user as to where the eyeshadow should be applied on their face.

Example 2

The product described in this example is a blush shown in an oval region on the cheeks. Here the location of the boundary region is relative to the face, such that if the face location where to change in the photograph then so would the location of the blush application region.

In this example, a dotted oval outline (which outline may be white in colour on when displayed on the photograph) is shown on the cheeks as an indication to the user as to where the blush should be applied to their face in order to achieve a certain sculpted look.

The tutorial may be provided for a product recommended by the system.

Although the invention has been described with reference to specific exemplary embodiments in the disclosure herein, varying modifications thereof will be apparent to those skilled in the art without departing from the scope of the invention as defined by the appended claims.

What is claimed is:

1. A method, executed in a computing device, of personalizing a product advertisement comprising:

storing, at the computing device, a digital product advertisement including therewithin a placeholder or a call to action for a photograph;
receiving a facial photograph, the facial photograph including a plurality of facial features;
detecting at least one of: a face; and at least one facial feature of the plurality of facial features;
using a boundary region to define a facial region to be modified by an application of a product being advertised, the boundary region having a location relative to one of: a boundary of the face and the at least one facial feature;
defining a color mask to visualize a coloring of original pixels of the boundary region, the mask comprising a gradient translucent coloring mask;
combining the color mask with original pixels in the boundary region of the facial photograph to define a recolored image of the facial region;
blending the recolored image back into the facial photograph using at least one selective blending mask to specify the rate of pixels to combine thereby to modify the facial region and simulate usage thereon of the product being advertised to create a modified facial photograph; and
generating, as a personalized product advertisement, the digital product advertisement including the modified facial photograph.

2. The method of claim 1 comprising, prior to the step of generating, modifying the photograph to indicate the facial region to be modified and generating, as a personalized tutorial, the digital product advertisement including the photograph indicating the facial region.

3. The method of claim 2 comprising using the boundary region to indicate the facial region.

4. The method of claim 3 comprising storing a plurality of different boundary regions associated with a same facial region, each boundary region created to define a different look for the facial region.

5. The method of claim 4 comprising receiving user input to select a specific look and using a respective one of the plurality of boundary regions as the boundary region to define the facial region to be modified to present the specific look.

6. The method of claim 4 comprising receiving user input and selecting a one of a plurality of product choices as the product to be used when simulating.

7. The method of claim 2 comprising receiving the facial photograph at an advertising website.

8. The method of claim 2 wherein the facial feature comprises an eye region, and the method comprises:
increasing a contrast of the original pixels within the boundary region
such that blending blends only specific sections of the recolored image back into the facial photograph in accordance with the at least one selective blending mask.

9. The method of claim 2 wherein the facial feature comprises a lip region, and wherein, before blending, the method comprises:
during the combining, applying a maximum filter such that if any blended pixel is darker by a predetermined threshold ranging between 50 to 100 percent of an original pixel color, then the original pixel color is used to define the recolored image; and
increasing an image contrast of the recolored image such that blending blends only specific sections of the recolored image back into the facial photograph in accordance with the at least one selective blending mask.

10. The method of claim 2 further comprising modifying the facial feature by simulating usage thereon of multiple products, colors, and styles being advertised.

11. The method of claim 2 comprising receiving the facial photograph at any one of a class of computers consisting of a mobile device and a computerized advertising kiosk.

12. The method of claim 2 wherein the facial feature is detected using a feature detection method utilizing skin, color, edge, and texture information to locate skin, eyes, and lips.

13. The method of claim 1 comprising:
   detecting at least one feature from the facial photograph, the feature comprising at least one of age, sex, skin color, hair color, mouth openness, nose shape, lip shape, eye shape, skin features, wrinkles, acne, or anomalies,
   extracting age, sex, skin color, hair color, mouth openness, nose shape, lip shape, eye shape, skin features, wrinkles, acne, or anomaly information by analyzing the at least one feature; and
   generating a recommendation, at the computing device, for an appropriate product based on the information as extracted and the product being advertised.

14. The method of claim 13 comprising providing a personalized tutorial using the facial photograph and a boundary region associated with the appropriate product, the tutorial presenting the facial photograph with an indication showing where on the face the appropriate product is to be applied.

15. A computer program product comprising a non-transitory storage medium having instructions stored thereon which when executed cause a computing device to personalize a product advertisement by:
   storing, at the computing device, a digital product advertisement including therewithin a placeholder or a call to action for a photograph;
   receiving a facial photograph, the facial photograph including a plurality of facial features;
   detecting at least one of: a face; and at least one facial feature of the plurality of fad features;
   using a boundary region to define a facial region to be modified by an application of a product being advertised, the boundary region having a location relative to one of: a boundary of the face and the at least one facial feature;
   defining a color mask to visualize a coloring of original pixels of the boundary region, the mask comprising a gradient translucent coloring mask;
   combining the color mask with original pixels in the boundary region of the facial photograph to define a recolored image of the facial region;
   blending the recolored image back into the facial photograph using at least one selective blending mask to specify the rate of pixels to combine thereby to modify the facial region and simulate usage thereon of the product being advertised to create a modified facial photograph; and
   generating, as a personalized product advertisement, the digital product advertisement including the modified facial photograph.

16. The computer program product of claim 15, wherein the instructions cause the computing device to, prior to the step of generating, modify the photograph to indicate the facial region to be modified and generate, as a personalized tutorial, the digital product advertisement including the photograph indicating the facial region.

17. The computer program product of claim 15 wherein the instructions cause the computing device to:
   store a plurality of different boundary regions associated with a same facial region, each boundary region created to define a different look for the facial region;
   receive user input to select a specify look; and
   use a respective one of the plurality of boundary regions as the boundary region to define the facial region to be modified to present the specific look.

18. The computer program product of claim 15 wherein the facial feature comprises an eye region, and the instructions cause the computing device to, before blending:
   increase a contrast of the pixels within the boundary region such that blending blends only specific sections back into the facial photograph in accordance with the at least one selective blending mask.

19. The computer program product of claim 15 wherein the facial feature comprises a lip region, and the instructions cause the computing device to, before blending:
   apply a maximum filter such that if any blended pixel is darker by a predetermined threshold ranging between 50 to 100 percent of an original pixel color, then the original pixel color is used to define the recolored image; and
   increase an image contrast of the recolored image such that blending blends only specific sections back into the facial photograph in accordance with the at least one selective blending mask.

* * * * *